Sept. 13, 1966    D. W. LUNDAHL    3,272,770
METHOD AND MANUFACTURE FOR PROPELLANT AERATION
Filed Feb. 1, 1963    5 Sheets-Sheet 1

INVENTOR.
Duane W. Lundahl

Sept. 13, 1966  D. W. LUNDAHL  3,272,770
METHOD AND MANUFACTURE FOR PROPELLANT AERATION
Filed Feb. 1, 1963  5 Sheets-Sheet 2

INVENTOR.
Duane W. Lundahl

INVENTOR.

Sept. 13, 1966    D. W. LUNDAHL    3,272,770
METHOD AND MANUFACTURE FOR PROPELLANT AERATION
Filed Feb. 1, 1963    5 Sheets-Sheet 5

INVENTOR.

United States Patent Office 3,272,770
Patented Sept. 13, 1966

3,272,770
METHOD AND MANUFACTURE FOR
PROPELLANT AERATION
Duane W. Lundahl, San Jose, Calif., assignor to United Aircraft Corporation, East Hartford, Conn., a corporation of Delaware
Filed Feb. 1, 1963, Ser. No. 255,516
2 Claims. (Cl. 60—35.3)

The present invention relates to an improved method and article of manufacture for thrust modulation of reaction motors and more particularly to a system for efficient density control of liquid propellants used in liquid and hybrid reaction motors.

In the application of certain missiles and space systems, it is necessary to provide a capability for wide-range throttling of thrust output. Current space missions require that engine thrust be varied from one-tenth to full thrust; and prospective space missions, such as orbital rendezvous and lunar landings, call for thrust variation of at least thirty to one. Present state-of-the-art techniques effect thrust modulation by decreasing the injection pressure through line throttling or decreasing injector port area or both. In the former approach, the injection velocity drops rapidly as the flow is throttled, resulting in a deterioration of the mixing pattern and, consequently, inefficient performance. As the flow rate drops further, the propellants, in effect, dribble into the chamber rather than flow, causing severe combustion instability. In the latter approach, serious reliability problems exist because variable area injectors have complex moving parts which are susceptible to heat failure by virtue of their location at the injector face.

More recently, improved systems for controlling the mass rate of flow of a liquid propellant flowing to a combustion chamber have been developed. These systems call for the injection of a secondary fluid possessing a density different from that of the liquid propellant whereby the average bulk density of the propellant may be modified in order to vary the mass of propellant consumed per unit time. In these systems which teach the injection of the density-control fluid directly into the propellant feed lines, it has been found that erratic response results requiring substantially larger quantities of the density-control fluid than theoretically necessary. In addition, non-uniform mixing occurs which results in localized overheating of the injector head.

It is the general purpose of this invention to provide an improved method and article of manufacture for effectively and efficiently aerating liquid propellents over a wide range of thrust levels which embrace all the advantages of similarly employed methods and devices and possesses none of the aforesaid disadvantages. To attain this, the present invention provides for the injection of the aeration medium at a point in close proximity to the propellant injection port located in the face of the injector. By so doing, it has been found that the propellant and density-control fluid form a mixture which maintains maximum homogeneity up to the instant of injection into the combustion chamber.

An object, therefore, of the present invention is to provide an improved method for aeration throttling of liquid propellant reaction motors.

A further object is to provide a thrust modulation system which is continuously variable over a wide range.

Another object is to provide a method for throttling by means of propellant density control wherein the separation of the liquid propellant mixture is substantially reduced.

Another object is the provision of a method for thrust modulation possessing relatively high combustion performance which can be maintained throughout the range of thrust modulation.

Another object is the provision of an improved injection head which permits efficient and effective density control of liquid propellants.

Still a further object is the provision of an improved multiple orifice injector head which does not overheat in localized areas.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
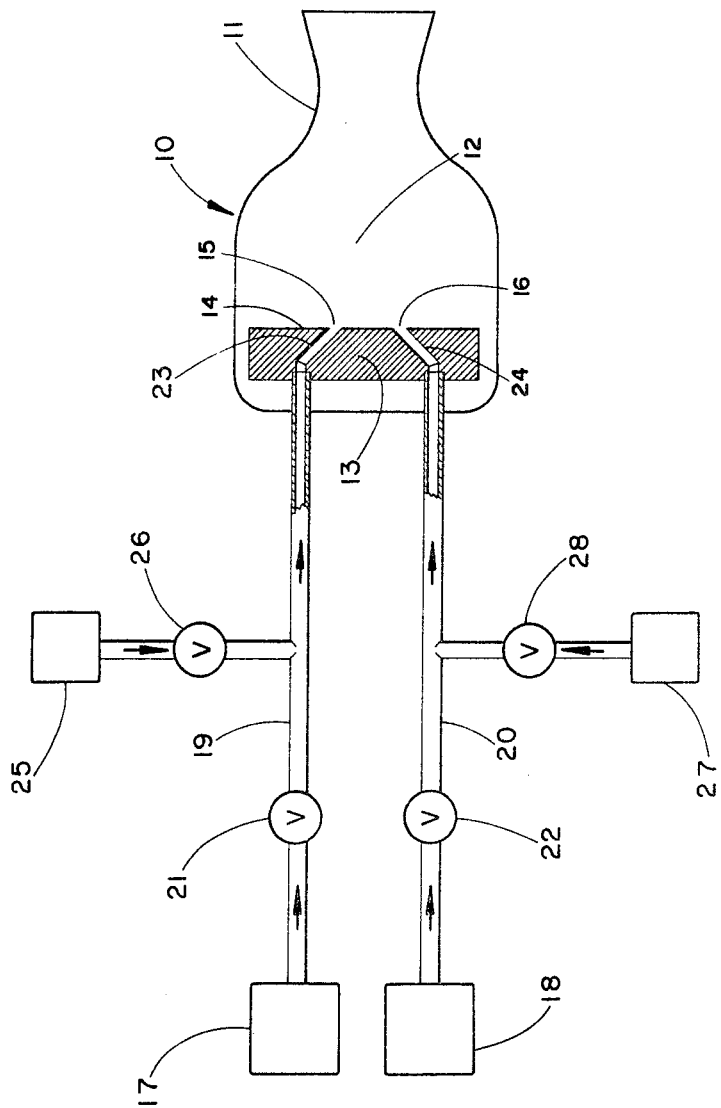
FIG. 1 illustrates the prior art technique feed-line aeration.

In FIG. 1 is shown a prior art system employing a conventional rocket engine thrust chamber 10 comprised of a nozzle 11, a combustion chamber 12, and an injector 13. The injector 13 has a face 14 with orifice 15 for the injection of a liquid fuel and orifice 16 for the injection of a liquid oxidizer. Tanks 17 and 18 are provided with fuel and oxidizer respectively which are caused to flow to the orifices 15 and 16 through lines 19 and 20 by opening valves 21 and 22. The motivating source for impelling the propellants from their respective tanks may be any one of a number of means well known in the art such as pressurizing said tanks with an inert gas. An example of a hypergolic bi-propellant system constitutes hydrazine as a fuel which is stored in tank 17 and nitrogen tetroxide as an oxidizer which is stored in tank 18.

In accordance with the method of operation of this system, valve 21 is opened to admit hydrazine from tank 17 through line 19 into injector cavity 23 and into the combustion chamber by injection through port 15. In a similar manner, the nitrogen tetroxide is caused to flow through line 20 into injector cavity 24 and out injector orifice 16 whereupon the hydrazine impinges upon the stream of nitrogen tetroxide and ignition and combustion take place producing the necessary working fluid for propulsion of the reaction motor system. Once the thrust engine is performing at its maximum thrust level and it becomes necessary to reduce the thrust level, this prior art system calls for the injection of a density-control medium stored in tank 25 into line 19 by selectively opening the valve 26. In a like manner, the oxidizer density is regulated by injecting the density-control medium contained in tank 27 to line 20 by opening valve 28. However, the components of the resultant mixture, by virtue of their distinct densities, have a tendency to separate or coalesce. Consequently, the mixture does not possess the homogeneity necessary for smooth unchoked flow through the injector orifices 23 and 24. Since injector heads invariably have a multitude of injection orifices on the combustion chamber face, it has been found that a substantial number of the ports inject gas-rich mixtures in the combustion chamber. Such a condition is conducive to overheating of the injector at these areas and produces engine failure if not catastrophic burning.

In accordance with the present invention, the instability, inefficiency, and heating problems of the prior methods have been substantially alleviated as hereinafter described in detail.

Figure 2:
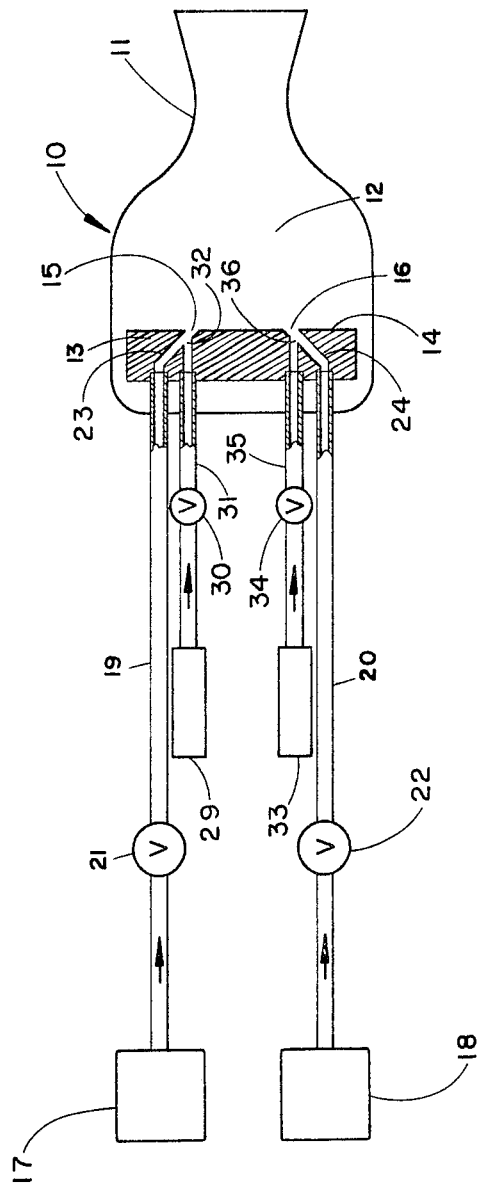
FIG. 2 illustrates a preferred embodiment of the present system of injector head aeration.

In FIG. 2 a preferred embodiment of the present invention is shown wherein the thrust chamber 10, injector 13 and propellant feed lines 19 and 20 are substantially the same. By opening valves 21 and 22 to full setting, maximum thrust level may be attained. However, in accordance with the present invention, when it becomes necessary to reduce the thrust level, the propellants are injected with the density-control medium directly within the injector head. By providing tank 29 with gaseous hydrogen and opening valve 30 to permit the gaseous hydrogen to flow through line 31 for injection at point 32 into the hydrazine, a homogeneous mixture of hydrazine and hydrogen are injected through port 15 into combustion chamber 12. In a like manner, by storing gaseous oxygen in tank 33 and opening valve 34 to permit passage of the gaseous oxygen through line 35 into cavity 24 at point 36, a homogeneous mixture of oxygen and nitrogen tetroxide results. The aerated propellants, which emerge from ports 15 and 16 and converge at a predetermined point within the combustion chamber for combustion, possess the necessary homogeneity to produce stable non-erratic combustion. By controlling the setting of the valves 30 and 34, it is possible to aerate the hydrazine and nitrogen tetroxide to produce a wide range of bulk densities. At maximum open positions of valves 30 and 34, the bulk density of the hydrazine and nitrogen tetroxide are reduced to less than five percent of the un-aerated propellants. Since the injection velocity of the propellant streams remains essentially constant, the reduction of thrust output is due solely to the decrease in the quantity of propellants consumed per unit time.

Figure 3:
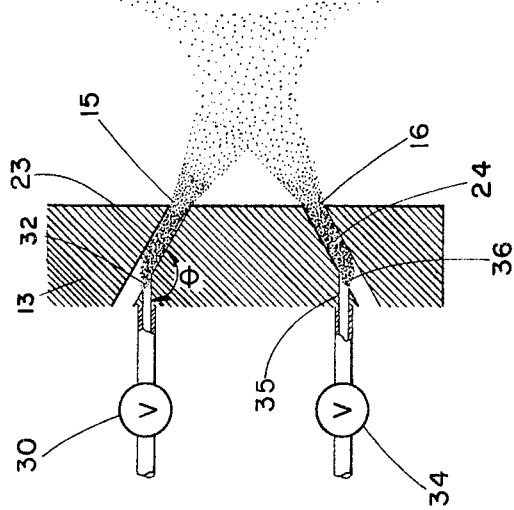
FIG. 3 illustrates in greater detail the propellant feeder elements and aeration lines of FIG. 2.
Figure 4:
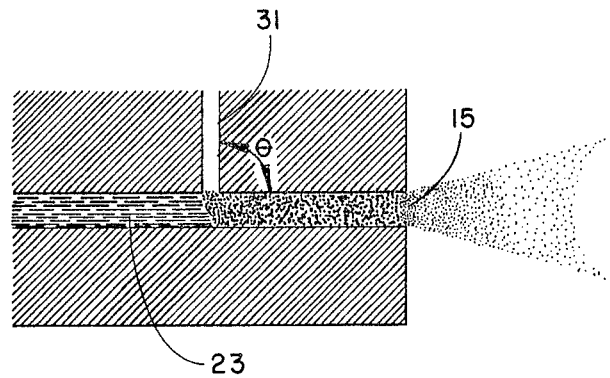
Figure 5:
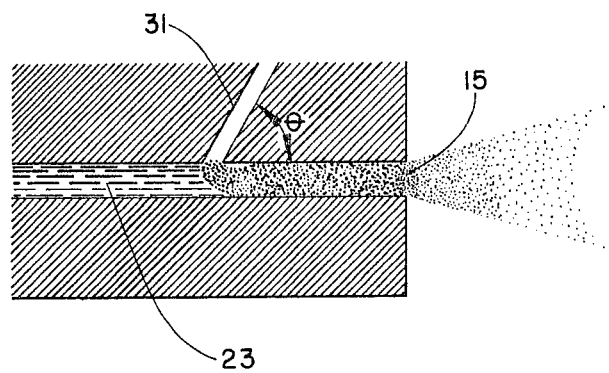
Figure 6:
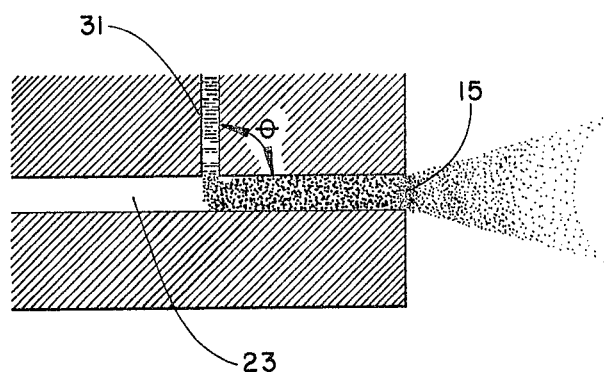
Figure 7:
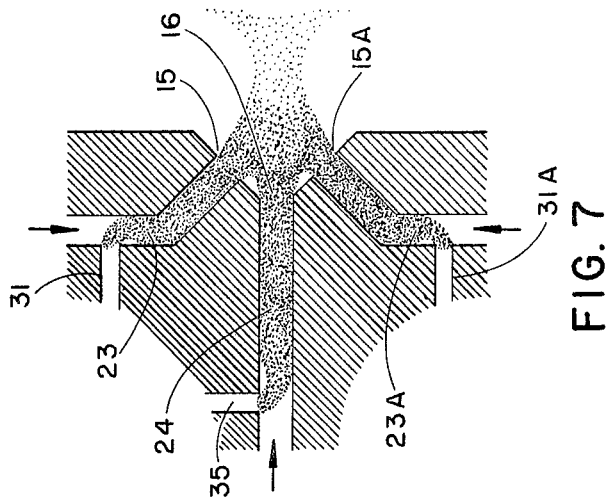

FIG. 3 illustrates in detail the propellant channels 23 and 24 and aeration channels 31 and 35. Although the angle theta between the propellant channel or cavity and the aeration channel in FIG. 3 is an obtuse angle, this is not necessary in all cases. As shown in FIG. 4 and FIG. 5, it is possible to vary these angles in order to provide for right angles or acute angles. In addition, the flow of fluids may be reversed as shown in FIG. 6 wherein the liquid propellant must bend around angle theta and the gas for aeration is injected in a straight line path. Another alternative employing three propellant feeder lines with ports converging at a point in the combustion chamber is illustrated in FIG. 7. In this particular embodiment, two fuel injection ports 15 and 15A are provided which impinge upon a central oxidizer port 16. In a manner similar hereinabove described, appropriate gases are injected into the injector perforations or feeder lines 31, 31A, and 35 in order to vary the propellant densities.

Figure 8:
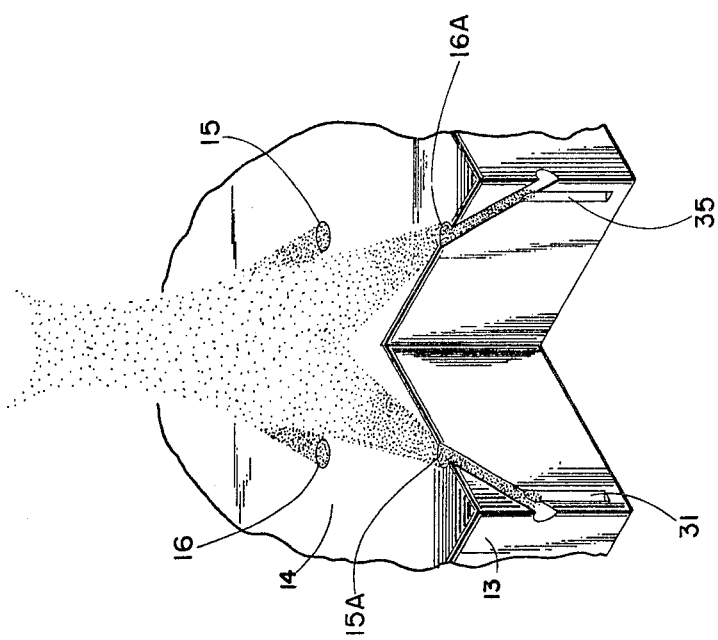
FIGS. 4 through 10 illustrate alternative arrangements of the propellant feeder elements and aeration lines.

In FIG. 8, a set of fuel injection ports 15 and 15A and oxidizer injection ports 16 and 16A are provided in face 14 of injector 13 to converge at a predetermined point within the combustion chamber. Again, the fuel and oxidizer flow streams are aerated with an appropriate density-control medium in lines 31 and 35. It is obvious that many modifications of injector port angles and injector fabrication may be employed within the scope of the present invention. For example, an injector face may be provided with a multitude of fuel and oxidizer sets such as those shown in FIG. 8 on the face of an injector 14. Appropriate manifolding for distributing the various fluids through their respective propellant feeder and aeration lines may be provided within the injector itself or alternatively may be manifolded in an external manner.

Figure 10:
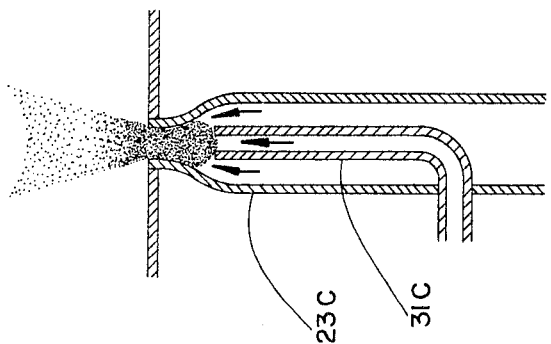
Figure 9:
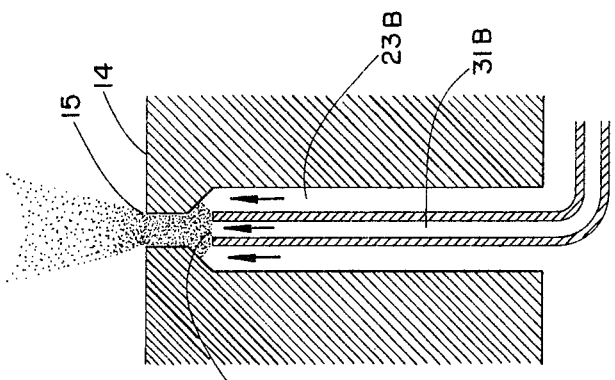

In FIG. 9, an alternative method for channeling the aeration medium is shown. Here the manifolding of the propellant passing through cavity 23 may be done externally of the injector as can be the manifolding of the aeration medium flowing line 31. In the event the injector is fabricated from sheet stock and is cast, the structural configuration necessary to carry out the present invention may be provided as shown in FIG. 10 where concentric tubes 31 and 23A carry the aeration medium and the propellant respectively.

It is readily apparent that the above described systems can employ a wide variety of liquid fuel and oxidants to effect the desired results. It is not necessary that the fuel and oxidants used in these systems be hypergolic since ignition devices may be employed in the combustion chamber. In addition, the present invention may be employed with any of the several prior art density modification systems. For example, tank 29 may contain an inert gas such as helium; or it may contain a reactive liquid such as nitrogen tetroxide for injection into a fuel such as hydrazine; or it may contain a reactive gas such as hydrogen for injection into a compatible propellant such as hydrazine. It is also apparent that the above described systems may be employed in hybrid reaction motors, mono-propellant systems, or jet engines employing aeration throttling.

Obviously, many modifications and variations of the present invention are possible in light of the above teachings. The structural systems described for carrying out the method of the present invention are merely exemplary and many alternative structural forms may be employed for practice of the instant invention. It is, therefore, to be understood that within the scope of the appended claims the invention may be practiced otherwise than as specifically described.

Having thus described the invention, what is claimed is:

1. A method of controlling the density of a liquid propellant for consumption in a reaction motor in which the thrust produced is responsive to changes in propellant density comprising the steps of providing a liquid propellant; flowing said liquid propellant to a first predetermined point for combustion; providing a fluid suitable for density modification of said liquid propellant, said fluid being capable of forming an initially uniform two-phase mixture with said liquid propellant which mixture has a tendency to separate into separate phases; injecting said fluid into said liquid propellant at a second predetermined point to form said uniform two-phase mixture, said second point being upstream from and immediately adjacent to said first predetermined point so that said two-phase mixture maintains uniformity during flow between said second and first predetermined points; and selectively varying the rate at which said fluid is injected into said liquid propellant to vary the density of the propellant and to control the thrust of said reaction motor.

2. An injector assembly for controlling the density of a liquid propellant flowing to a reaction motor combustion chamber by injection of a first and a second fluid into said combustion chamber, the thrust of said reaction motor being responsive to changes in said density, wherein said first fluid is provided by a liquid propellant source and said second fluid is provided by a propellant density-control fluid source, comprising an injector having at least one face in proximity to said combustion chamber, at least one injection port in said face, at least one perforation through said injector providing fluid communication from said propellant source to each said injection port, and at least one passage means providing fluid communication from said propellant density-control fluid source to each said perforation at a point upstream from and immediately adjacent to each said injection port;

and means for selectively varying the flow rate of said second fluid to selectively adjust the mass flow rate of said first fluid by forming a uniform mixture of said first and second fluids which mixture maintains substantial uniformity upon passage through each said injector port.

References Cited by the Examiner

UNITED STATES PATENTS

| | | | |
|---|---|---|---|
| 2,391,422 | 12/1945 | Jackson | 158—74 X |
| 2,405,785 | 8/1946 | Goddard | 60—35.6 X |
| 2,835,106 | 5/1958 | Carter | 60—35.6 |
| 2,874,539 | 2/1959 | Fox | 60—35.6 X |
| 2,884,758 | 5/1959 | Oberle | 60—39.28 X |
| 2,931,429 | 4/1960 | Brown | 60—39.28 X |
| 2,933,894 | 4/1960 | Johnson et al. | 60—39.28 |
| 2,987,873 | 6/1961 | Fox | 60—39.28 X |
| 3,045,424 | 7/1962 | Morrell | 60—35.6 |
| 3,073,119 | 1/1963 | Brown et al. | 60—35.6 |
| 3,104,696 | 9/1963 | Schwindeman. | |
| 3,143,401 | 8/1964 | Lambrecht | 60—39.74 X |

MARK NEWMAN, *Primary Examiner.*

SAMUEL FEINBERG, SAMUEL LEVINE, *Examiners.*

G. L. PETERSON, D. HART, *Assistant Examiners.*